Nov. 25, 1941.  J. M. MONTGOMERY ET AL  2,264,139
APPARATUS FOR CONDITIONING PRECIPITATES AND
SEPARATING SAME FROM LIQUIDS
Filed Aug. 22, 1939
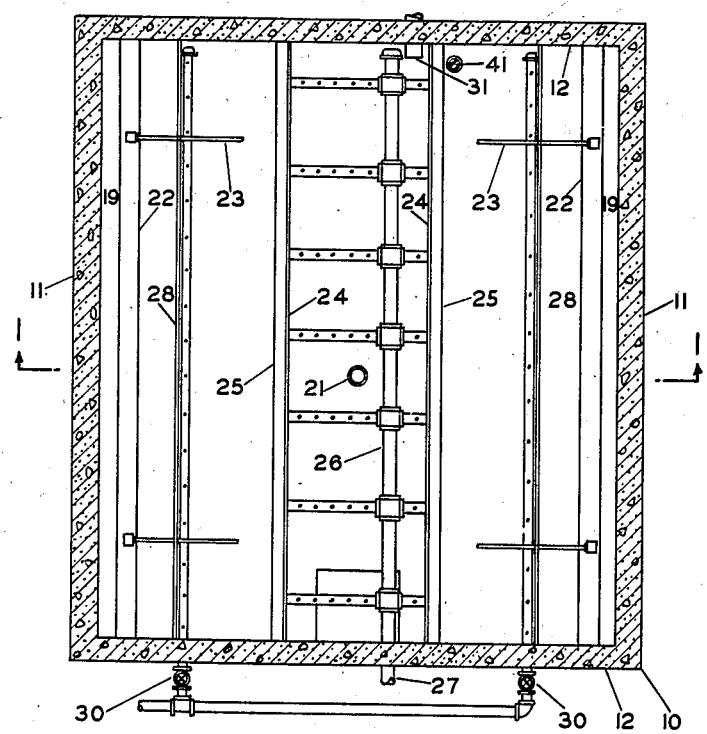
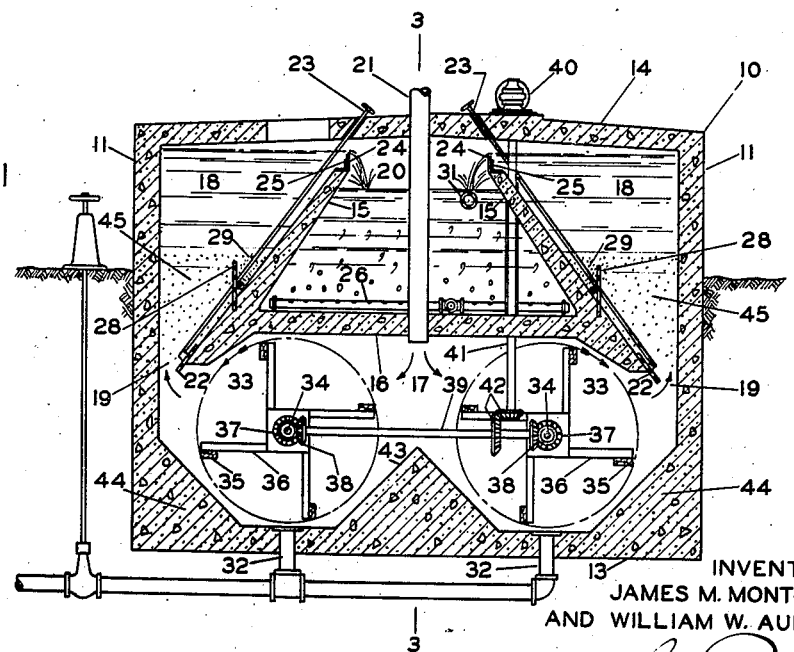
INVENTORS:
JAMES M. MONTGOMERY
AND WILLIAM W. AULTMAN
BY
ATTORNEY.

Patented Nov. 25, 1941

2,264,139

UNITED STATES PATENT OFFICE 2,264,139

APPARATUS FOR CONDITIONING PRECIPITATES AND SEPARATING SAME FROM LIQUIDS

James M. Montgomery and William W. Aultman, Los Angeles, Calif., assignors to The Permutit Company, New York, N. Y., a corporation of Delaware Application August 22, 1939, Serial No. 291,312

12 Claims. (Cl. 210—16)

This invention relates to apparatus for conditioning precipitates and separating same from liquids; and it is an improvement on the apparatus of the Spaulding Patents 2,021,672 issued November 19, 1935, and 2,127,314, issued August 16, 1938.

One object of our invention is to provide an apparatus in which the available space is utilized to the fullest extent;

Another object is to provide an apparatus which is relatively simple to construct;

Another object is to provide horizontal shaft agitator means whereby the bottom of the coagulating vessel is uniformly swept and low velocity areas are avoided so that a uniform suspension of sludge is maintained in the coagulating vessel;

A further object is to provide adjustable means for varying the opening through which the coagulating and precipitating vessels communicate;

A further object is to provide within the apparatus simple means for concentrating sludge prior to removal; and A still further object of our invention is to provide within the apparatus, a chamber for collecting the clarified liquid in which chamber it may be further treated, for instance by carbonization.

The manner in which the foregoing objects are achieved is shown in the accompanying drawing, in which:

Fig. 1 is a vertical section of an apparatus according to our invention, more or less diagrammatic and taken along line 1—1 of Fig. 2; and Fig. 2 is a plan view of the same apparatus with the cover removed.

Similar reference numerals refer to similar parts throughout the drawing.

The apparatus comprises a rectangular tank 10 having vertical side walls 11, vertical end walls 12, a bottom 13, and an optional cover 14. Within the tank 10, running between the walls 12, are walls 15, inclined to the horizontal at angles of preferably not less than 45 degrees and terminating short of the side walls 11 so as to form openings 19. A horizontal wall 16 extends between the end walls 12 and the inclined walls 15, as shown. These walls thus define within tank 10 a coagulating vessel 17 below wall 16; a pair of wedge-shaped precipitating vessels 18 in free and open communication with the coagulating vessel 17 through the openings 19, and bordered by the inclined walls 15 and portions of the side walls 11 and end walls 12; and a collecting and further treatment chamber 20 above wall 16 and bordered by the inclined walls 15 and portions of the end walls 12.

An inlet pipe 21 passes downwardly through cover 14 and horizontal wall 16 into the coagulating vessel 17.

The communicating openings 19 are adjustable in size by means of gates 22 which are arranged to slide on inclined walls 15 and may be raised or lowered by means of rods 23 extending through the cover 14.

On the upper edges of inclined walls 15 are weirs 24 which are preferably made adjustable by attachment to angles 25 so that the weirs may readily be adjusted to have their upper edges perfectly horizontal. These upper edges, as shown in Fig. 1, terminate below the level of the side-walls.

Within the collecting and further treatment chamber 20 is a perforated pipe grid 26 having an inlet 27 connected to a source (not shown) of carbon dioxide containing gas, such as flue gas.

On the inclined walls 15 are mounted vertical baffles 28 running from one end wall 12 to the other and thus forming sludge concentration chambers 29 provided with valved perforated outlets 30.

An outlet 31 for treated water passes from chamber 20 through one of the end walls 12. Valved outlets 32 on the bottom 13 serve to remove sludge and to drain tank 10 for inspection, cleaning, or repair.

Within the coagulating vessel 17 are two agitators 33 comprising horizontal shafts 34 running parallel to the side walls 11, and horizontally extending blades 35 mounted on shafts 34 by means of radial brackets 36. Each of the shafts 34 carries a bevel gear 37 meshing with a corresponding bevel gear 38 on a horizontal shaft 39 which is slowly rotated by a motor 40 with integral gear reduction through a vertical shaft 41 and bevel gears 42. The agitators 32 are thus rotated in opposite directions to each other, the blades moving in circular paths as indicated by the arrows and passing downwardly in proximity to the openings 19.

The bottom 13 has a wedge-shaped projection 43 running along its center from one end wall 12 to the other, and the corners between the bottom 13 and the side walls 11 are filled in as shown at 44. In this manner the bottom is given a form closely fitting the periphery of the agitators 33, and dead spaces or low velocity areas where precipitates might settle out and accumulate are filled up.

The operation of this apparatus will now be described with particular reference to water treatment. The motor 40 runs and slowly rotates the agitators 33 at a peripheral speed of the order of 1 to 3 feet per second. Water to which suitable reagent, such as lime, has been added in the required proportion, is admitted through inlet pipe 21 into the coagulating vessel 17 where it is mixed and gently agitated by the agitators 33.

The water then passes up through openings 19 into the precipitating vessels 18 wherein precipitates are maintained in suspension by the upward flow, thus forming the sludge filters 45 which aid in efficient and rapid removal of the precipitates, as described in the Spaulding patents referred to above. As the water rises through vessels 18 its velocity decreases due to the divergence of walls 11 and 15, and above a certain level the precipitates are no longer maintained in suspension and stay behind. Clear water flows over weirs 24 into chamber 20.

In the sludge filters 45 the concentration of precipitates is of the order of 2 percent by weight. Some of this sludge flows over baffles 28 into chambers 29 where, in the absence of any vertical flow, the concentration increases to an order of 10 to 20 per cent. This concentrated sludge is removed through outlets 30, either continuously at a slow rate, or intermittently.

When sludge particles grow in size to such extent that the rising flow in vessels 18 cannot maintain them in suspension they drop through openings 19 into the coagulating vessel 17. Such sludge particles can be removed periodically through outlets 32.

The pipe grid 26 distributes carbon dioxide containing gas which bubbles up through the clear water in chamber 20 and reacts with excess lime left after the reactions have been completed, thus stabilizing the water. The treated, clarified and stabilized water then passes through outlet 31 to use.

Excess of lime is usually employed where considerable quantities of magnesium are precipitated. When the magnesium content of the water is low, or when only a limited reduction of the magnesium content is desired, no excess of lime is used. In such cases stabilization by recarbonation in chamber 20 is not necessary. The pipe grid is then omitted and chamber 20, serving only for the collection of the clear water flowing over weirs 24, may be made smaller by raising the horizontal wall 16.

The horizontal shaft agitators in conjunction with the bottom so shaped as to extend everywhere close to the circular paths of the agitator blades result in a sweeping of the entire bottom at a uniform velocity. At the same time the upward sweep of the blades physically lifts the sludge, maintaining it uniformly suspended throughout the coagulating vessel. All this is accomplished with a moderate agitator speed and without imparting to the liquid anywhere agitation so violent as to break up the sludge particles and render them colloidal in nature. Such grinding up of the precipitates would result in a higher turbidity of the effluent and thus render the apparatus less effective.

The arrangement of the agitators in such manner that the blades move in a downward direction in proximity to the openings between the coagulating and precipitating vessels prevents any agitation from penetrating into the precipitating vessels and thus avoids any disturbance of the sludge filters, without the use of baffles or the like.

The absence of curved shapes, difficult and expensive to form, makes our apparatus particularly suited for concrete construction, as illustrated in the drawing. If desired, however, the apparatus may be fabricated of steel which is more economical in smaller sizes.

Length, width and, to some extent, depth of tank 10 may be varied for a given capacity within wide limits. This flexibility makes our apparatus particularly suitable for cases where the fullest utilization of a limited space is essential. In small installations only half of the apparatus shown in the drawing may be used by placing a side wall in the plane of line 3—3 (Fig. 1), employing but one agitator and one precipitating vessel. In very large installations, on the other hand, where a number of units are required they may be placed side by side, and the side walls between adjacent units may then be omitted, resulting in a saving of space and greater economy in construction.

By raising or lowering the gates 22 the openings 19 are adjusted in size so as to maintain a sludge filter giving best results.

While we have described the operation of the apparatus with particular reference to lime treatment of water, it may, of course, be used for other types of treatment involving precipitation of matter dissolved in liquids or the coagulation and removal of suspended matter. Modifications of the apparatus shown and described will readily occur to those skilled in the art without departing from the spirit of our invention, and reference is, therefore, made to the following claims for a definition of the scope of our invention.

The combination of sludge concentration means with liquid treating apparatus of the type shown in the above-specified Spaulding patent is not claimed generically herein but is more broadly claimed in the pending application of William B. Gurney, Serial No. 309,549, filed December 16, 1939, to which reference is hereby made.

We claim:

1. Apparatus for treating liquid comprising a tank having a rectangular bottom, side walls and end walls, an inclined wall extending from one end wall to the other and having its upper edge terminating below the level of the side walls and its lower edge and its upper edge terminating short of both side walls, partition means terminating short of at least one side wall dividing the space within the tank on the lower side of the inclined wall into an upper and a lower chamber, horizontal agitator means in said lower chamber, a horizontal shaft supporting said agitator means, means for rotating the horizontal shaft, a liquid inlet for said lower chamber, and a liquid outlet for said upper chamber.

2. Apparatus for treating liquid comprising a tank having a rectangular bottom, side walls and end walls, an inclined wall extending from one end wall to the other and defining in said tank an upper chamber and a lower chamber, said inclined wall having a lower edge terminating short of one of the side walls thus defining an opening between said one side wall and the lower edge of the inclined wall through which opening said chambers communicate with each other, a plate on the inclined wall, means for moving said plate to different positions to vary the size of the opening, horizontal agitator means in the tank below the inclined wall, horizontal shafting supporting the agitator means, means for rotating said shafting, means for admitting liquid to said lower chamber and means for withdrawing liquid from the upper chamber.

3. Apparatus for treating liquid comprising a tank having a rectangular bottom, side walls and end walls, an inclined wall extending from one end wall to the other and defining in said tank an upper chamber and a lower chamber, said inclined wall having a lower edge terminating short of one of the side walls thus defining an opening between said one side wall and the lower edge of the inclined wall through which opening said chambers communicate with each other, rotary horizontal agitator means in the tank below the inclined wall, horizontal shafting supporting the agitator means, means for rotating the shafting, filling means on the bottom running from one end wall to the other and extending upwardly close to the periphery of the agitator means, means for admitting liquid to said lower chamber, and means for withdrawing liquid from said upper chamber.

4. Apparatus for treating liquid comprising a tank having a rectangular bottom, side walls and end walls, an inclined wall extending from one end wall to the other and defining in said tank an upper chamber and a lower chamber, said inclined wall having a lower edge terminating short of one of the side walls thus defining an opening between said one side wall and the lower edge of the inclined wall through which opening said upper chamber and said lower chamber communicate with each other, horizontal agitator means in the tank below the inclined wall comprising blades and horizontal shafting supporting the blades, means for rotating the shafting in such direction that the blades move downwardly in proximity to the opening, means for admitting liquid to the lower chamber, and means for withdrawing liquid from the upper chamber.

5. Apparatus for treating liquid comprising a tank having a rectangular bottom, side walls and end walls, an inclined wall extending from one end wall to the other and defining in said tank an upper chamber and a lower chamber, said inclined wall having a lower edge terminating short of one of the side walls thus defining an opening between said one side wall and the lower edge of the inclined wall through which opening said upper chamber and said lower chamber communicate with each other, a baffle plate on said inclined wall, a sludge concentration chamber between said baffle plate and the inclined wall, means for withdrawing sludge from said chamber, horizontal agitator means in the tank below the inclined wall, a horizontal shaft supporting the agitator means, means for rotating said shaft, means for admitting liquid to the lower chamber, and means for withdrawing liquid from the upper chamber.

6. Apparatus for treating liquid comprising a tank having a rectangular bottom, side walls and end walls, a pair of walls inclined toward each other and running from one end wall to the other and having upper edges spaced apart from each other and terminating below the level of the side walls and having lower edges spaced from the side walls, a partition extending between the inclined walls and defining an upper chamber and a lower chamber, horizontal agitator means in the lower chamber, a horizontal shaft supporting the agitator means, means for rotating said horizontal shaft, means for admitting liquid to the lower chamber, weirs at the upper edges of the inclined walls adapted to discharge liquid into said upper chamber, and a liquid outlet for said upper chamber.

7. In the apparatus of claim 6, baffles on each of the inclined walls, sludge concentration chambers between said baffles and the inclined walls, and means for withdrawing sludge from the sludge concentration chambers.

8. In the apparatus of claim 6, distributing means in the upper chamber adjacent the partition, and means for supplying carbon dioxide containing gas to said distributing means.

9. Apparatus for treating liquid comprising a tank having a rectangular bottom, side walls and end walls, a pair of walls inclined toward each other and running from one end wall to the other and having upper edges spaced apart from each other and terminating below the level of the side walls and having lower edges spaced from the side walls, a partition extending between the inclined walls and defining an upper chamber and a lower chamber, a pair of horizontal agitators in the lower chamber, horizontal shafts supporting said agitators, means for rotating said shafts in opposite directions, means for admitting liquid to the lower chamber, weirs at the upper edges of the inclined walls adapted to discharge liquid into said upper chamber, and a liquid outlet for said upper chamber.

10. In the apparatus of claim 9, filling means on the bottom running parallel to the shafts and extending upwardly close to the periphery of the agitators.

11. Apparatus for treating liquid comprising a tank having a rectangular bottom, side walls and end walls, a pair of walls inclined toward each other, running from one end wall to the other and defining in said tank a lower chamber and two upper chambers, said inclined walls having their lower edges terminating short of the side walls, thus defining openings between the side walls and the lower edges of the inclined walls through which openings the lower chamber communicates with said upper chambers, a pair of horizontal agitators in the lower chamber, each agitator having blades and a horizontal shaft supporting the blades, means for rotating the shafts in opposite direction to each other in such manner that the blades move downwardly in proximtiy to the openings, means for admitting liquid to the lower chamber, and means for withdrawing liquid from the upper chambers.

12. Apparatus for treating liquid comprising a tank having a rectangular bottom, side walls and end walls, a pair of walls inclined toward each other, running from one end wall to the other, and having their upper edges spaced apart from each other and terminating below the level of the side walls and having their lower edges terminating short of the side walls, thus defining openings between the side walls and the lower edges of the inclined walls, a horizontal partition extending between the inclined walls and defining an upper chamber and a lower chamber, a pair of horizontal agitators in the lower chamber, each agitator having blades and a horizontal shaft supporting the blades, means for rotating the shafts in opposite direction to each other so that the blades move in circular paths, passing downwardly in proximity to the openings, filling means on the bottom running from one end wall to the other and extending upwardly close to the circular paths of the blades, means for admitting liquid to the lower chamber, weirs at the upper edges of the inclined walls adapted to discharge liquid into the upper chamber, and a liquid outlet for the upper chamber.

JAMES M. MONTGOMERY.
WILLIAM W. AULTMAN.